Figure 1:
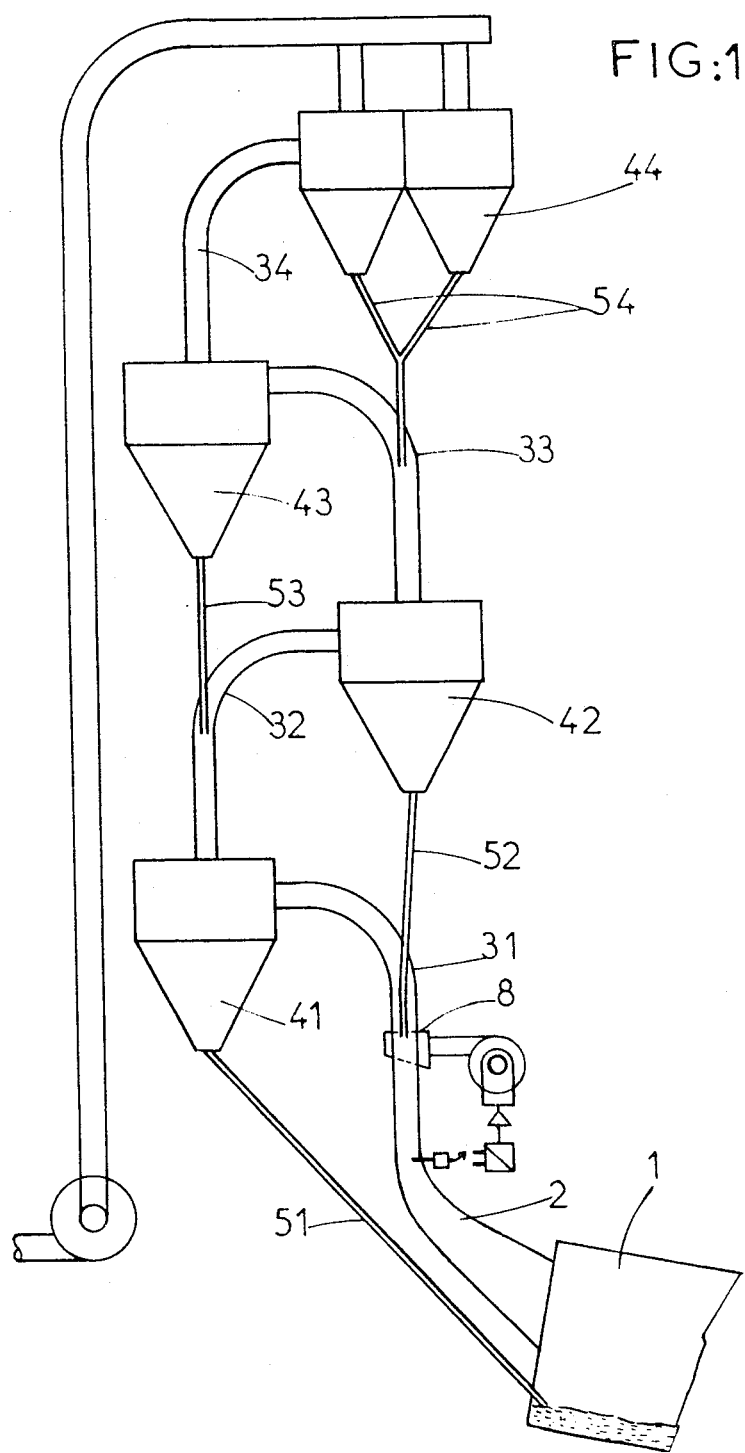

United States Patent [19]
Lippmann

[11] 3,761,582
[45] Sept. 25, 1973

[54] METHOD AND APPARATUS FOR CONTROLLING THE DEGREE OF PREPARATION OF RAW MATERIAL FOR CEMENT

[75] Inventor: Jean Pierre Lippmann, Soisy Sous Montmorency, France

[73] Assignee: Creusot-Loire, Paris, France

[22] Filed: July 29, 1971

[21] Appl. No.: 167,294

[30] Foreign Application Priority Data
Oct. 13, 1970 France .............................. 7036935

[52] U.S. Cl. .............................................. 423/659
[51] Int. Cl. ............................................. F27b 15/00
[58] Field of Search ...................... 263/32; 423/175, 423/176, 177, 635, 659

[56] References Cited
UNITED STATES PATENTS
3,491,991   1/1970   Abelitis ............................ 263/32 R
2,663,561   12/1953   Muller .............................. 263/32 R
3,563,519   2/1971   Lippmann ........................ 263/32 R FOREIGN PATENTS OR APPLICATIONS
1,154,012   8/1966   Great Britain ....................... 263/32
  859,907   10/1959   France ................................. 263/32

Primary Examiner—William F. O'Dea
Assistant Examiner—Harold Joyce
Attorney—William B. Kerkam, Jr. et al.

[57] ABSTRACT

Method and apparatus for controlling the degree of preparation of raw material for cement to be fed to a rotary kiln from a pre-heating zone comprising a series of ducts and separation chambers wherein, when the raw material has reached a temperature intermediate the decomposition temperatures of magnesium carbonate and calcium carbonate, the raw material is subjected to a rapid temperature drop capable of delaying calcium carbonate decomposition until the raw material has entered the rotary kiln.

13 Claims, 4 Drawing Figures

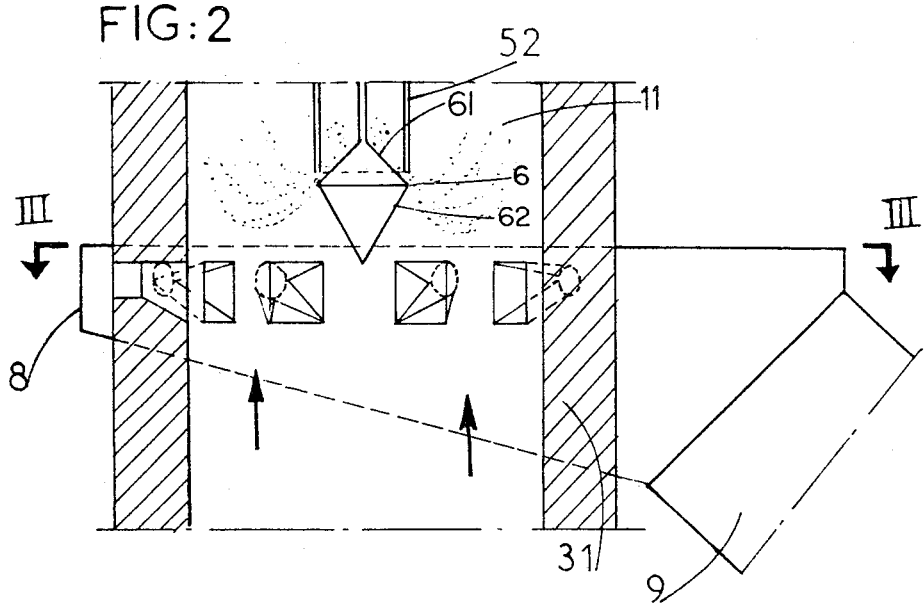
FIG:2
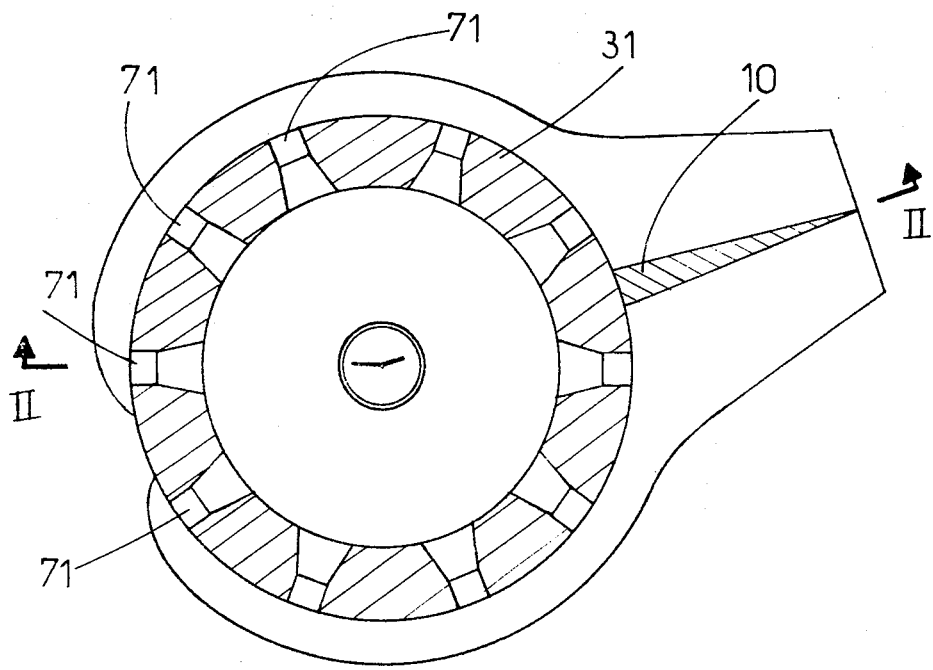
FIG:3

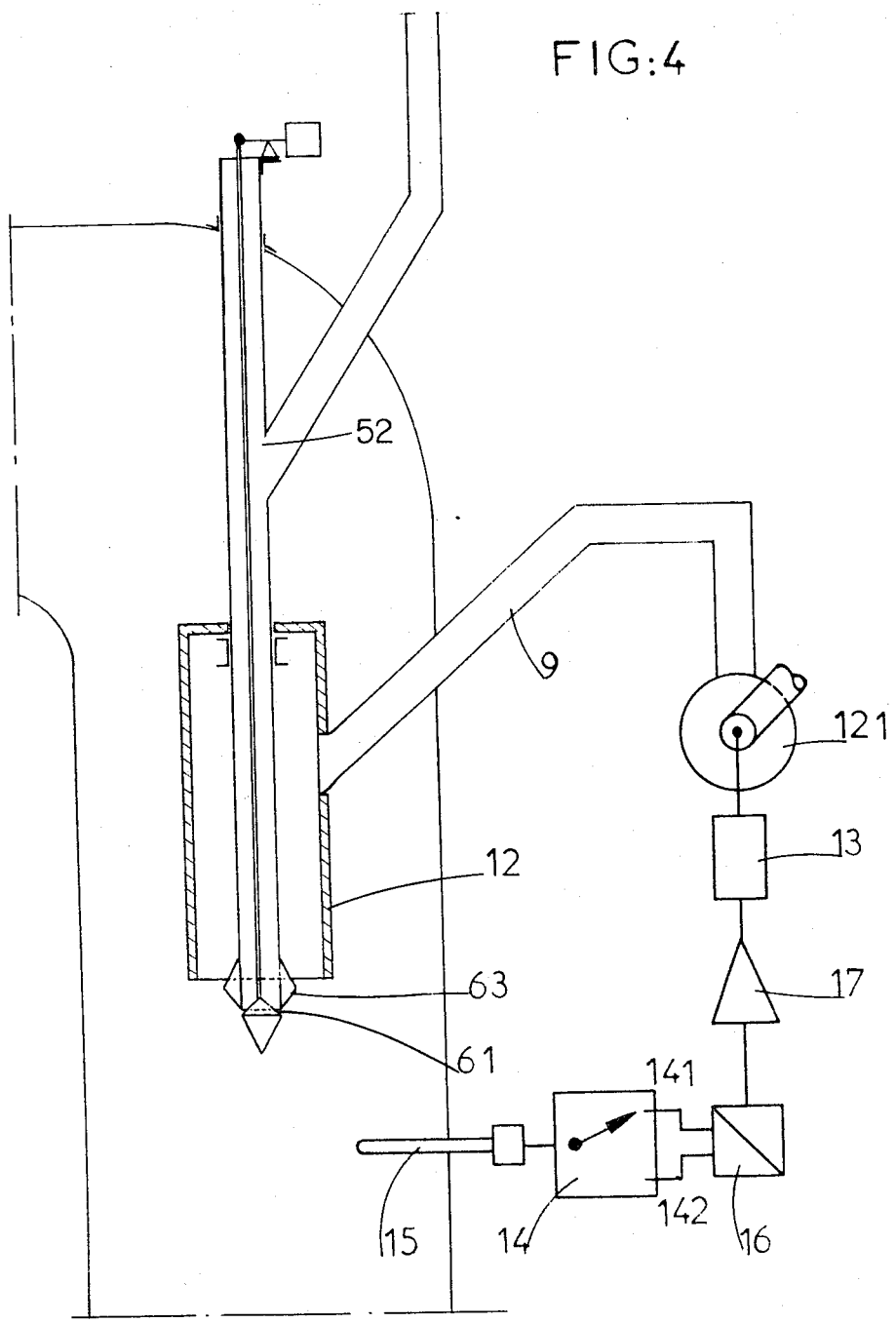
FIG:4

METHOD AND APPARATUS FOR CONTROLLING THE DEGREE OF PREPARATION OF RAW MATERIAL FOR CEMENT

This invention relates to a method of controlling the degree of preparation of cement raw materials before entering the rotary kiln.

It is well known that the gases escaping from the rotary kiln in installations for the production of cement by the dry process are fed to an installation for pre-heating the material fed to the kiln. This pre-heating installation may be constructed in various ways but usually comprises a series of heaters through which the hot gases leaving the kiln pass successively and in which the material is suspended in the current of gas, each heater being followed by a zone for separation of the gas-material mixture, the material flowing from one separation zone to another towards the kiln inlet and undergoing progressive partial decomposition by heating in contact with the gases. In this way, the material fed at the top of the pre-heating installation has a temperature of about 800° to 850° on arriving in the kiln. Conversely, the gases leaving the kiln at a temperature of about 1,000° to 1,150° leave the pre-heating installation end at a temperature of substantially 300°.

A chute forming a continuation of the outlet orifice of the last separator delivers the materials heated in this way either directly to the kiln inlet or to the inclined base of the kiln discharge gas box which connects the kiln to the first discharge gas duct. It has been found that one of the gratest difficulties encountered in the use of pre-heaters resulted from the clogging of the discharge gas box and the start of said duct. Such clogging is always due to the condensation of the volatile impurities contained in the fuel and in the raw materials, which combine with one another to form harmful concretions of substantially undefined chemical composition, generally mainly alkaline or alkaline-earth.

It has been found that these harmful condensations are practically always due to the existence of too high a kiln discharge gas temperature, such temperature being greater than the condensation temperature of such salts which are therefore deposited on the colder static parts of the installation with all the accompanying disadvantages of clogging and instability of operation of the system. It is difficult to control the temperature of the rotary kiln discharge gas. The invention obviates these disadvantages and relates to a method of controlling the degree of preparation of the material in the pre-heater, of modifying the heat exchanges between the material and the gases inside the pre-heater, and thus indirectly controlling the discharge gas temperature.

It is further found that this problem can be avoided if the material is subjected—in the pre-heater zone in which it has reached a temperature level between the decomposition temperatures of magnesium carbonate and of calcium carbonate to a rapid temperature drop capable of delaying the calcium carbonate decomposition until after the material has entered the rotary kiln.

Thus according to one aspect of the invention, there is provided a method of controlling the degree of preparation of the raw materials for cement before such materials enter the rotary kiln, in a pre-heating installation comprising a series of heaters through which the hot gases leaving the kiln pass successively and in which the material is suspended in the current of gas, each heater being followed by a zone for separation of the gas material mixture, the material flowing from one separation zone to another towards the kiln inlet and undergoing progressive partial carbonate decomposition by heating in contact with the gases, characterized in that the material is subjected—in the pre-heater zone in which it has reached a temperature level between the decomposition temperature of magnesium carbonate and the decomposition temperature of calcium carbonate—to a rapid temperature drop capable of delaying the calcium carbonate decomposition until after the material has entered the rotary kiln.

The invention also relates in a further aspect to apparatus for performing the said method in conventional pre-heating installations.

The invention will now be described with reference to a number of embodiments given by way of example and illustrated in the accompanying drawings, in which:

FIG. 1 is a general diagram of a conventional pre-heating installation provided with a system adapted to performance of the method according to the invention, FIG. 2 is an elevation of a detail of a first embodiment of the system according to the invention, FIG. 3 is a plan view on the line III — III in FIG. 2, and FIG. 4 is an elevation of a second embodiment of a system according to the invention.

FIG. 1 diagrammatically illustrates a conventional installation comprising a rotary kiln 1, the discharge gases of which flow through a discharge gas box 2 to a material pre-heating installation comprising a series of ducts, 31, 32, 33, 34 which interconnect material separation stages 41, 42, 43, 44 each comprising one or two cyclones, the material outlet orifice of each cyclone being extended by a tube 51, 52, 53, 54 for introducing the materials into the preceding duct (31, 32, 33, 34) or directly to the kiln inlet.

According to the embodiment shown in FIGS. 2 and 4, the end of each material supply tube is disposed on the axis of the gas flow duct. The tube outlet may be closed by a balanced flap 6 (FIG. 2) comprising two cones 61 and 62 connected by their bases, the top cone 61 distributing the material in a conical layer with the concavity extending downwardly, while the bottom cone 62 uniformly divides the ascending gas current to give a perfect distribution of the material in suspension in the gas current and thus improve the heat exchange between the material and the gas in the top part of the duct as far as the next separating cyclone.

It has been found that the material leaves the cyclone 42 at a temperature of about 600° and that it reaches a temperature greater than 600° in the cyclone 41. The temperature of dissociation of the carbonates of magnesium is known to be about 540° and that of calcium carbonate is about 820°. In these conditions, the magnesium carbonate which practically always accompanies calcium carbonate is completely dissociated when the material is introduced into the duct 31.

The existance of free magnesia appears to promote the formation of free lime. Consequently, the dissociation of calcium carbonate starts only after dissociation of magnesium carbonate. For this reason, according to the invention, the material is subjected to an abrupt temperature drop in the temperature range between the dissociation of its alkaline-earth salts, i.e. between the last and last but one separation stage. This results in a material quenching effect such that decomposition of calcium carbonate will be delayed until after the material has entered the kiln. In this way, the endothermic reaction for the dissociation of calcium carbonate will be shifted from cyclone 41 to the inlet of the kiln 1. This displacement of an endothermic zone is a means of modifying the heat exchange equilibrium in the kiln and in the pre-heater. The shifting of the endothermic decomposition reaction to the kiln inlet results in a heat absorption and the discharge gases leaving the kiln are therefore colder. Since the calcium carbonate decomposition reaction requires a certain temperature level and the presence of free magnesia and since, after its abrupt cooling, the material encounters no further heat source until it enters the kiln, it is possible flexibly to control the temperature absorption at the kiln inlet by speeding up or reducing the speed of the decomposition reaction in dependence on the temperatures required at the kiln outlet. The delay in the calcium carbonate decomposition can in fact be controlled by accurate control of the temperature of the mixture of gas and material in the region of the material distribution orifice, by controlling the cooling of the material.

On introduction into the duct 31, the material will preferably be cooled by an injection of cooled gas across the flow of material leaving the supply tube. It will be apparent that it is possible to control the temperature drop and hence the decomposition delay, by controlling the temperature and the rate of injection of the cooling gases.

As a result of this cooling of the kiln discharge gas exit end, the volatile impurities contained in the kiln atmosphere can condense on the materials arriving in the kiln or on the kiln wall and will for the most part remain enclosed within the material under treatment and will then be discharged to the exterior together with the clinker.

FIGS. 2 and 3 illustrate a first example of an embodiment of the system adapted to the performance of the method according to the invention.

FIG. 2 illustrates the top part of the gas flow duct 31 before its entry into the cyclone 41, at the material supply tube outlet 52. Just below the flap or valve 6 the duct 31 and its refractory lining are formed with a plurality of orifices 7 which flare out towards the interior of the duct and are uniformly distributed over the periphery thereof.

The orifices 7 are surrounded by an outer annular casing 8 into which leads a cooling gas supply conduit 9. At the outlet of the conduit 9, the casing is provided with a deflector 10 which separates the current of gas into two equal streams and the internal section of the casing 8 decreases in size as far as the orifice 71 remote from the gas inlet, so as to maintain a constant pressure over the group of orifices 7. The cold gases thus injected through orifices 7 are immediately taken up by the hot streams of gases rising at high speed in the duct 31 and immediately come into contact with the materials 11 dispersed in the form of layers by the cone 61, thus giving the required abrupt cooling of the materials.

In another embodiment shown in FIG. 4, the cooling gas supply conduit 9 leads into an annular casing 12 surrounding the end of the material supply tube 52. The casing 12 is closed at the top and is suspended from the tube 52. It is open at the bottom and the end of the tube 52 above the flap or valve 61 is provided with a conical deflector 63 which produces a layer of cooling gas which comes directly into contact with the material already taken up and dispersed in the ascending current of gas.

FIG. 4 also shows an example of a means of controlling the system.

The cooling gas supply conduit 9 is connected to the delivery of a fresh-air intake fan 121 which is controlled by a variable speed motor 13. By means of a thermocouple 15, a pyrometer 14 measures the temperature of the gases leaving the kiln, i.e. upstream of the materials dispersal orifice and the cooling system. The pyrometer 14 is set between two temperature levels 141, 142 forming the limits of the optimum temperature of the kiln discharge gases. Between these two temperatures, the pyrometer 14 through the agency of an amplifier 16 and a servomotor 17, controls the speed of the fan driving motor 13 between zero speed and maximum speed.

In this way, if the recorded temperature of the kiln discharge gas at the thermocouple 15 is excessive, the pyrometer 14 controls the drive of the motor 13 which delivers the maximum gas flow into the casing 8 and cools the materials delivered by the flap 6. The calcium carbonate decomposition reaction in the materials cooled in this way is thus delayed and occurs in the kiln, the kiln discharge gas temperature being reduced. As this temperature decreases to the optimum temperature measured by the thermocouple 15, the speed of the fan and hence the injected gas flow decreases. If the temperature drops below the predetermined minimum temperature, the injection of cold gas is stopped and the decomposition delay is thus reduced until the temperature rises again.

Of course the invention is not limited by the details of the above described exemplified embodiment, which could be modified without departing from the scope of the invention.

For example, to control the rate of flow of cooling gas it would be possible to use a constant-speed fan provided with a control valve, the position of which could be controlled by the temperature measured by the pyrometer 14, the valve being completely open at the maximum temperature 141 and closed at the minimum temperature 142.

Instead of being external air, the cooling gas could be some of the gases which after passing through the pre-heater are taken from the outlet thereof. It would also be possible to control the degree of cooling of the material by controlling the temperature of the injected gases; the gases taken from the pre-heater outlet at a temperature of about 300° as will have been apparent, may have been previously mixed with cold external air introduced into the supply conduit 9. In such a case, the gas flows from the pre-heater and the external air would be controlled by the measurement of the temperature of the kiln discharge gases, either by controlling the speed of the fans or the position of the control valves.

Although the installation has been described above in connection with a cyclone pre-heater, it could readily be modified to adapt the method to any other type of pre-heater.

In prior art installations it was difficult to control the site of the calcium carbonate decomposition reaction in the installation. With the method according to the invention, by means of measurable cooling at a predetermined place in the pre-heater, it is possible reliably to localise the calcium carbonate decomposition endothermic reaction to the discharge gas exit end of the rotary kiln and it is therefore easier to calculate the heat exchanges in the various zones of the installation.

I claim:

1. A method of controlling thermal exchanges in preparation of the raw materials for cement before such materials enter the rotary kiln, in a preheating installation of a series of heaters through which the hot gases leaving the kiln pass successively and in which the material is suspended in the current of gas, each heater being followed by a zone for separation of the gas-material mixture, the material flowing from one separation zone to another towards the kiln inlet and undergoing progressive partial carbonate decomposition by heating in contact with the gases, comprising the steps of controlling the temperature of the gases leaving the kiln, establishing an endothermic reaction zone in the kiln, abruptly cooling the material in the zone of the preheater where the material has reached a temperature between the temperature of decarburization of magnesium and the temperature of decarburization of calcium, and delaying decarburization of the calcium to the endothermic reaction zone in the kiln.

2. A control method according to claim 1, including the step of injecting gas across the flow of material to abruptly cool the material.

3. A control method according to claim 2, including the step of controlling the rate of flow of the injected gas at a fixed temperature to control the temperature drop of the material.

4. A control method according to claim 2, including the step of controlling the temperature of the injected gas at a constant rate of flow to control the temperature drop of the material.

5. A control method according to claim 2, including the step of simultaneously controlling the temperature and the rate of flow of the injected gas to determine the temperature drop of the material.

6. A control method according to claim 2, including the step of controlling the rate of flow of injected gas by the temperature of the gases leaving the kiln.

7. A control method according to claim 2, the injected gas being external air.

8. A control method according to claim 2, the injected gas being taken from the outlet of the preheating installation.

9. A control method according to claim 2, each heater being a duct for the flow of the gases and the materials in suspension and leads into a cyclone for separating the gas-material mixture having a bottom orifice connected to a tube leading into a duct situated upstream of the cyclone in the direction of flow of the gases, the further step of injecting the injected gas into the duct, across the flow of material into the duct.

10. Apparatus for controlling the degree of preparation of the raw materials for cement comprising a kiln, a pre-heating installation, a series of successive ducts in said installation for the flow of gases leaving the kiln, each duct leading into a separation chamber, a gas outlet orifice for each of said chambers formed by the next duct, a materials outlet orifice for each of said chambers, a tube leading from each of said orifices for introducing said materials into a preceding duct, an end of said tube extending into and along the axis of the said duct, a fan for delivering cooling gas, a gas supply casing connected to said fan disposed coaxially about one of the ducts, at least one orifice for injection to the interior of the duct at the outlet of the tube for the introduction of the corresponding materials, said orifice injecting a current of cooling gas distributed uniformly about the axis.

11. Apparatus according to claim 10, the duct provided with the cooling gas injection casing being the first duct to receive the hot gases leaving the kiln.

12. Apparatus according to claim 10, the wall of the duct with said casing having a plurality of uniformly spaced orifices opening into the cooling gas supply casing.

13. Apparatus according to claim 10, the lower end of the material supply tube being open and discharging through an annular aperture and a gas dispersion cone partially closing said aperture.

* * * * *